Patented Oct. 7, 1952

2,612,682

UNITED STATES PATENT OFFICE 2,612,682

METHOD OF CLADDING A COPPER-BASE METAL TO AN ALUMINUM CORE

Harry B. Burrack, Brooklyn, N. Y., assignor to Reynolds Metals Company, Richmond, Va., a corporation of Delaware No Drawing. Application April 5, 1946, Serial No. 659,892

2 Claims. (Cl. 29—189)

1

This invention relates to the cladding of aluminum with other metals and has for its object the provision of an improved method of cladding metal to an aluminum core such as aluminum strip, slabs or ingots. The invention is concerned with the bonding of the cladding metal to aluminum in a hot rolling operation in the atmosphere and provides a cladding metal protected from oxidation at temperatures incident to hot rolling, as well as certain steps in the production of the cladding metal and in the rolling of the cladding metal to aluminum.

My invention provides a copper-base cladding metal which includes electrolytic copper and other commercial grades of copper and suitable copper alloys, such as bronze, brass, cupro-nickels and silver nickels, with the bonding surface protected with mechanically adhering aluminum foil, a method of applying the foil, and a method of bonding the foil-protected copper-base metal to aluminum. The aluminum core and the foil may be either pure aluminum or any alloy of aluminum that may be found suitable. In accordance with my invention I heat the cladding metal and the aluminum to temperatures sufficient to facilitate hot rolling, say from 750° F. to 950° F., and roll at such temperatures in the atmosphere. While I may heat the metals in any suitable manner, my invention permits heating in any ordinary furnace using no special atmosphere, as in the air or in mixtures of combusted gases with air, and transferring the hot metal through the atmosphere to the rolling mill. If the copper-base metals were heated, transferred, or rolled under such oxidizing conditions, a film of oxide would form on the exposed surfaces sufficient to prevent satisfactory bonding.

I have found that aluminum foil may be rolled onto a suitably conditioned surface of the cladding metal under proper rolling conditions, thereby causing a sort of mechanical adhesion of the foil which protects the surface from oxidation while it is being heated up to the temperature for hot rolling and bonding. I have also found that the foil does not interfere with the bonding. Any suitable aluminum foil may be used, for example, foil from 0.001 to 0.002 inch in thickness. I prefer to roughen a clean oxide-free surface of the cladding metal, for example, mechanically as by embossing or abrasive action, or chemically as by etching, and then to roll the foil and cladding metal together under such pressure as to effect a reduction in overall thickness of the two metals. Such reduction in thickness may be in the neighborhood of 5% to 15% for effective results. It is especially advantageous to heat the foil and cladding metal and to roll them together while

2 hot. The rolling at several hundred degrees F. above room temperature gives a better mechanical bond or adhesion of the foil to the cladding metal. The temperature must be kept below the oxidizing temperature of the cladding metal which is about 450° F. for copper and 625° F. for brass and the cupro-nickel alloys. At these temperatures appreciable oxide formation takes place in normal atmospheres.

One of the important features of my invention is the cladding of the aluminum with the other metals by hot rolling in the atmosphere and I accomplish this by protecting the bonding surface of the cladding metal with an oxygen-excluding barrier in the form of aluminum foil. A very strong intermetallic bond may be formed between aluminum and one of the aforementioned cladding metals by hot rolling at a temperature which is sufficiently elevated to cause a sort of interlocking of the two metals at the interface and forming a firm bond that will withstand bending and other stresses to which the clad metal may be subjected. The most effective hot rolling is carried out at temperatures in the range of 750° F. to 950° F. It is desirable, if not essential, to effect a substantial reduction in overall thickness during the first pass through the rolls and it is accordingly advisable to roll at temperatures near the upper limit. The reduction in thickness, in addition to the temperature, is significant in that it effectuates such a working of the metals on the initial pass as to form an intermetallic bond. The greater metallic activity at high temperature plus the greater metal flow due to excessive working cause the metals to infuse with each other at the interface. After the first pass, the metal may be sent through the rolls with a plurality of passes sufficient to reduce the metal to any desired gauge thickness.

The invention is applicable to the bonding of the cladding metal to aluminum strip, slabs or ingots. In bonding to strip it is advantageous to use coils of both the cladding metal and the aluminum core which are of the same width and preferably the same length. The cladding metal is previously rolled with aluminum foil, as above described, and then coiled. Both coils are heated in any suitable way to a hot rolling temperature of from 750° F. to 950° F. The two strips are superposed and led into a standard hot mill adjusted to effect a reduction in overall thickness of from 10% to 25% during the first pass. The bonding is accomplished in this operation and the metal may be recoiled for use or finishing, or rolled to gage while hot. If coiled and cooled, the metal may be rolled to gage at any time. The first pass effects such an interfacial dispersion of the metals that the aluminum foil loses its identity and becomes part of a strong, firm bond between the metals.

In a somewhat similar operation, I may apply the foil protected cladding metal to a slab or an ingot of aluminum. For example, I may apply a cooper sheet 0.1 inch thick to a 2 inch thick slab of aluminum. I may, accordingly, hot roll this composite body of metal to an overall thickness of, say, 0.064 inch to produce a copper clad aluminum sheet having approximately 0.003 inch of copper and 0.061 inch of aluminum.

When I refer to hot rolling, I refer to any suitable hot rolling, and especially to the conventional hot rolling in standard mills. The rolling is, of course, carried out in the atmosphere.

The invention is described in connection with bonding a cladding metal to one surface of the aluminum core. My invention applies to the similar bonding of cladding metal to both surfaces of the aluminum core. Both surfaces of the core may be clad by repeating the operation above described, using two sheets of copper and by rolling both cladding metal sheets, one on each surface, to the core in the same operation.

The following examples illustrate methods of the invention:

Example I

Surface cleaned and mechanically roughened copper strip of 0.008 inch gage, 26 inches wide and 200 feet long was given a preliminary heat preferably of from 300° F. to 425° F., which is below the oxidizing temperature. This strip was coiled for convenient handling. The coil was transferred to a rolling mill, and as it was fed to the rolls it was surfaced by aluminum foil led down from an upper roll, the aluminum foil being of 0.001 inch in thickness. The overall rolling reduction of the composite copper and foil was about 10%. At the end of the rolling mill the composite strip was coiled. It was then heated to about 850° F. and repassed through the rolling mill along with an aluminum strip of about 0.081 inch thickness at the same temperature, the foil face being interposed. As the composite copper and foil strip is fed through the roll, it is bonded to the aluminum strip. For satisfactory bonding, the first pass should effect a heavy reduction, say, 25% in overall thickness. The rolling operation may reduce the copper-foil composite strip to 0.006 inch and the aluminum strip to 0.058 inch on the finished material.

If it is desired to clad both faces of the aluminum strip with copper, the procedure is altered accordingly, composite copper-foil strips being prepared and heated preliminary to rolling with the aluminum strip and interposed on both faces of the latter strip.

Example II

An aluminum slab 2 inches thick, 26 inches wide and 100 inches long, and a copper sheet 0.100 inch thick, 26 inches wide and 100 inches long are to be bonded. Aluminum foil 0.001 inch in thickness and of the same dimensions as the copper sheet was placed over the copper sheet and both metals were heated to about 425° F. and transferred to the rolling mill and the foil facing rolled thereon. In the rolling of the foil on the copper sheet I prefer a reduction of 10% of the composite body, but the reduction may be greater.

Notwithstanding a reduction by the rolls of the copper-foil composite body to the extent of 10%, only a mechanical bond of the two metals was effected. To achieve an intermetallic bond the temperature must be raised above that temperature which results in appreciable oxide formation on unprotected copper.

The foil protected copper sheet is then heated to about 850° F., and the aluminum slab is given a corresponding heat. The two pieces, aluminum slab and copper sheet, were then brought together with the aluminum foil between them and hot rolled. On the first pass through the mill the overall thickness of both metals was reduced about 20%. A plurality of passes was then used to reduce the material to any desired finish gage.

I claim:
1. In the cladding of a copper-base metal to an aluminum core the method which comprises heating the copper-base metal to a temperature of from 300° F. to 425° F. and rolling aluminum foil thereon while hot to form a mechanical bond therebetween, heating the copper-base metal with the foil attached and the aluminum core to a hot rolling temperature of at least 750° F., and subjecting the heated metals while at a temperature which facilitates roll reduction thereof to a rolling operation to effect a substantial overall reduction, thereby firmly bonding the copper-base metal to the aluminum.

2. In the cladding of a copper-base metal to an aluminum core the method which comprises heating a copper-base metal strip having its bonding surface protected from oxidation by an aluminum foil and an aluminum core to a temperature in the range of from 750° F. to 950° F., passing the copper-base metal and aluminum core in superposed relation with the aluminum foil interposed through a hot rolling operation while at about 750° F. to about 950° F. in the atmosphere under pressure sufficient to give a substantial reduction in overall thickness and effect a firm bond of the copper-base metal to the aluminum core.

HARRY B. BURRACK.

REFERENCES CITED

The following references are of record in the file of this patent:

UNITED STATES PATENTS

| Number | Name | Date |
|---|---|---|
| 685,479 | Wachwitz | Oct. 15, 1901 |
| 929,778 | Monnat | Aug. 3, 1909 |
| 958,641 | Heeren | May 17, 1910 |
| 1,660,246 | Wille | Feb. 21, 1928 |
| 1,667,787 | Jaeger | May 1, 1928 |
| 1,679,308 | Jordan | July 31, 1928 |
| 1,934,673 | Klemperer | Nov. 7, 1933 |
| 2,171,040 | Merritt | Aug. 29, 1939 |
| 2,383,511 | Reynolds | Aug. 28, 1945 |

FOREIGN PATENTS

| Number | Country | Date |
|---|---|---|
| 11,824 | Norway | May 4, 1903 |
| 520,365 | Great Britain | Apr. 22, 1940 |

OTHER REFERENCES

A Comprehensive Treatise on Inorganic and Theoretical Chemistry, vol. III, p. 131, Longmans, Green and Co., London, England, 1927. Copy in Div. 59.